US006119085A

United States Patent [19]

Lewis et al.

[11] Patent Number: 6,119,085

[45] Date of Patent: Sep. 12, 2000

[54] RECONCILING RECOGNITION AND TEXT TO SPEECH VOCABULARIES

[75] Inventors: James R. Lewis, Delray Beach; Kerry A. Ortega, Deerfield Beach, both of Fla.

[73] Assignee: International Business Machines Corporation, Armonk, N.Y.

[21] Appl. No.: 09/049,730

[22] Filed: Mar. 27, 1998

[51] Int. Cl.$^{7}$ .......... G01L 7/08

[52] U.S. Cl. .......... 704/260; 704/255

[58] Field of Search .......... 704/260, 200, 704/231, 266, 251, 252, 255, 256, 257, 258

[56] References Cited

U.S. PATENT DOCUMENTS

| | | | |
|---|---|---|---|
| 4,692,941 | 9/1987 | Jacks et al. | 395/2.69 |
| 4,831,654 | 5/1989 | Dick | 395/2.69 |
| 5,384,893 | 1/1995 | Hutchins | 395/2.76 |
| 5,636,325 | 6/1997 | Farrett | 704/258 |

*Primary Examiner*—Richemond Dorvil
*Attorney, Agent, or Firm*—Quarles & Brady LLP

[57] ABSTRACT

A method for reconciling pronunciation differences between respective vocabularies of recognition and text to speech (TTS) engines in a speech application, first compares respective pronunciations of each word in the recognition engine's vocabulary with each word's pronunciation by the TTS engine, second, for each word for which the pronunciations are different, the recognition engine's pronunciation of the different word is added to an exception dictionary of the TTS engine. Before adding the recognition engine's pronunciation of the different word to the exception dictionary, each different word is tested for form consistent with the exception dictionary. Each different word which is not consistent in form with the exception dictionary is converted to a suitable form prior to being added to the exception dictionary. The pronunciations are compared by comparing baseforms of the pronunciations.

8 Claims, 1 Drawing Sheet

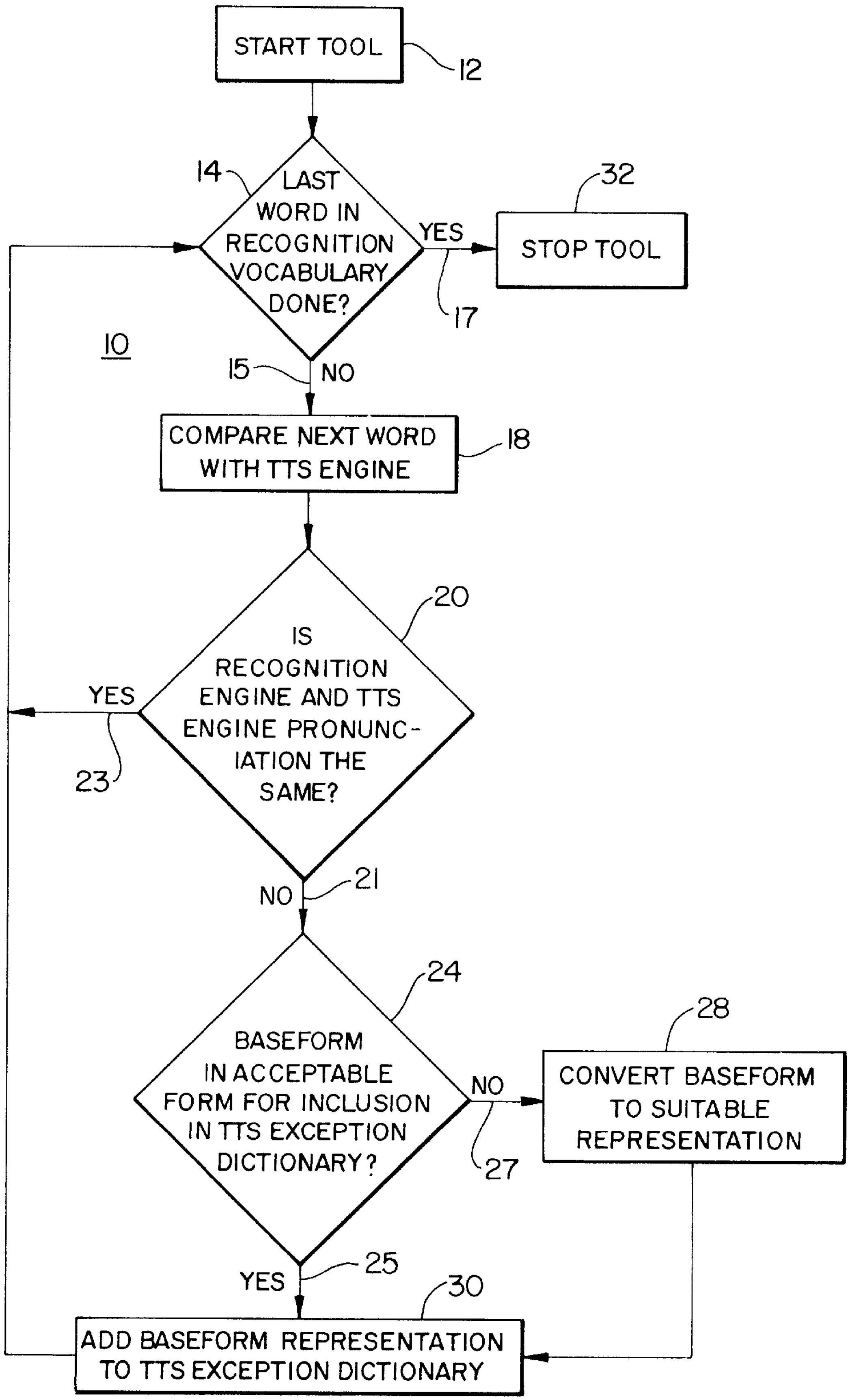
START TOOL
12
14
LAST WORD IN RECOGNITION VOCABULARY DONE?
YES
32
STOP TOOL
17
10
15
NO
COMPARE NEXT WORD WITH TTS ENGINE
18
20
IS RECOGNITION ENGINE AND TTS ENGINE PRONUNC-IATION THE SAME?
YES
23
NO
21
24
BASEFORM IN ACCEPTABLE FORM FOR INCLUSION IN TTS EXCEPTION DICTIONARY?
NO
27
28
CONVERT BASEFORM TO SUITABLE REPRESENTATION
YES
25
30
ADD BASEFORM REPRESENTATION TO TTS EXCEPTION DICTIONARY

RECONCILING RECOGNITION AND TEXT TO SPEECH VOCABULARIES

BACKGROUND OF THE INVENTION

1. Field of the Invention

This invention relates generally to the field of speech applications, and in particular, to a tool or method for reconciling pronunciation differences between recognition and text to speech vocabularies in the speech application.

2. Description of Related Art

As developers move toward integrated speech-oriented systems, it is important for the pronunciations for speech recognition engines and text to speech (TTS) engines to be consistent. The pronunciations are represented by base forms. Each speech application comes with a list of all words, which represents an active vocabulary. The words are in base forms, which represent acoustic data derived from the words as spoken. The base forms are used in the nature of instructions as to how to pronounce or say words, for use by the TTS engine of the speech application. The base forms are also used to compare and identify spoken words. If the base form for a spoken word generated by the recognition engine, for example, can be matched closely enough to a base form in the vocabulary list, that word will be presented to the user as the word which was recognized as having been spoken into the speech application. Some measure of uncertainty as to the match can result in the generation of a list of alternate words for the user to choose from in the event the recognized word is not correct. Too much uncertainty in the match will result in a failure to recognize the spoken word.

A TTS can be very useful for indicating to users how the system expects the users to pronounce on-screen text, such as speech commands used to control an application. If the base forms differ for a word in that command, then the TTS pronunciation of the command can mislead the user.

If a speech application uses a recognition engine and a TTS engine produced by different developers, then the likelihood that the two engines will work well together is very slim, at best. Even if the same developer produced both engines, fundamental differences in the way recognition engines and TTS engines work will very likely lead to inconsistencies in pronunciations. The vocabulary of a recognition engine contains a large but finite set of base forms, typically on the order of tens of thousands, to which a user can add words and pronunciations as required. A TTS engine usually, but not necessarily, consists of a small set of pronunciations contained in an exception dictionary and a set of rules for pronouncing everything else.

There is a clear need for a tool or method for identifying and reconciling differences between recognition and TTS pronunciations of the words in the recognition engine's active vocabulary.

SUMMARY OF THE INVENTION

In accordance with an inventive arrangement, a method or tool puts each word in the recognition engine's vocabulary through the TTS system one at a time to determine the pronunciations produced by the TTS for that word. The pronunciation is evaluated in terms of the baseforms, which can be likened to a set of phonemes.

Next, the method or tool compares the TTS pronunciation to the recognition engine's baseforms, using a function such as DMCHECK available from IBM®, to determine if the pronunciations are essentially or substantially the same.

If the pronunciations are essentially or substantially the same, the method or tool moves on to the next word in the recognition engine's vocabulary. If the pronunciations are not essentially or substantially the same, the tool or method places the base form from the recognition engine into the exception dictionary of the TTS engine. If necessary, a routine to convert the base form to a suitable pronunciation for the TTS system is utilized.

The tool or method continues until every word in the recognition engine's vocabulary has been tested.

A method for reconciling pronunciation differences between respective vocabularies of recognition and text to speech (TTS) engines in a speech application, in accordance with an inventive arrangement, comprises the steps of: comparing respective pronunciations of each word in the recognition engine's vocabulary with each word's pronunciation by the TTS engine; and, for each word for which the pronunciations are different, adding the recognition engine's pronunciation of the different word to an exception dictionary of the TTS engine.

Before adding the recognition engine's pronunciation of the different word to the exception dictionary, the method can further comprise the step of testing each the different word for form consistent with the exception dictionary.

Each different word which is not consistent in form with the exception dictionary is converted to a suitable form prior to being added to the exception dictionary.

The pronunciations are compared by comparing baseforms of the pronunciations.

A method for reconciling pronunciation differences between respective vocabularies of recognition and text to speech (TTS) engines in a speech application, in accordance with another inventive arrangement, comprises the steps of: comparing respective pronunciations of each word in the recognition engine's vocabulary with each word's pronunciation by the TTS engine; for each word for which the pronunciations are substantially the same, repeating the comparing step for a different word in the vocabulary; for each word for which the pronunciations are different, determining if the pronunciation of the recognition engine is in a form compatible with an exception dictionary of the TTS system; for each different word which is in a form compatible with the exception dictionary of the TTS system, adding the recognition engine's pronunciation of the different word directly to the exception dictionary and repeating the comparing step for a different word in the vocabulary; and, for each different word which is in a form incompatible with the exception dictionary of the TTS system, converting the incompatible different word to a compatible form, adding the converted pronunciation of the different word to the exception dictionary, and repeating the comparing step for a different word in the vocabulary.

The pronunciations are compared by comparing baseforms of the pronunciations.

BRIEF DESCRIPTION OF THE DRAWINGS

The sole FIGURE is a flow chart of a method in accordance with the inventive arrangements for reconciling pronunciation differences between respective vocabularies of recognition and TTS engines in a speech application.

DETAILED DESCRIPTION OF THE PREFERRED EMBODIMENTS

A flow chart illustrating the method 10 in accordance with the inventive arrangements is shown in the sole FIGURE, wherein the method, also referred to herein as a tool, is started in accordance with the step of block 12. The decision step in block 14 asks whether or not the last word in the recognition engine's vocabulary is done. If not, the method branches on path 15 to the step of block 18, in accordance with which the next word is analyzed with the TTS system.

If the result of the TTS analysis is the same as the recognition system base form, the method branches on path 23 back to decision step 14. This indicates that the respective pronunciations of the recognition engine and the TTS engine for that word essentially or substantially correspond to one another and that no special steps need to be taken towards reconciliation. If the result of the TTS analysis is not the same as the recognition engine base form, the method branches on path 21 to decision block 24. This indicates that the respective pronunciations of the recognition engine and the TTS engine for that word do not correspond to one another and that special steps do need to be taken towards reconciliation.

Decision block 24 asks whether or not the baseform is in acceptable form for inclusion in the TTS exception dictionary. If the baseform is in such acceptable condition, the method branches on path 25 to block 30. In accordance with the step of block 30 the baseform representation of the recognition engine's pronunciation is placed into the TTS exception dictionary. If the baseform is not in such acceptable condition, the method branches on path 27 to block 28. In accordance with the step of block 28, the recognition engine's baseform is converted into a suitable representation, and thereafter, the converted baseform is placed into the TTS exception dictionary in accordance with the step of block 30. From the step of block 30, the method returns to decision block 14.

The method continues on one of three possible loops, depending on the outcomes of the decision steps in blocks 20 and 24, until the last word in the recognition vocabulary is done. A first loop represents matching pronunciations not requiring reconciliation. The first loop includes decision block 14, block 18, decision block 20 and path 23. A second loop represents pronunciation which do not match, wherein the pronunciation of the recognition engine can be added directly to the TTS exception dictionary. The second loop includes decision block 14, block 18, decision block 20, path 21, decision block 24, path 25 and block 30. A third loop represents pronunciation which do not match, and wherein the pronunciation of the recognition engine must be converted to a suitable representation before being added to the TTS exception dictionary. The third loop includes decision block 14, block 18, decision block 20, path 21, decision block 24, path 27, block 28 and block 30.

When the last word in the recognition vocabulary is done, the method branches on path 17 to the step of block 32, in accordance with which the tool is closed, or the method terminated.

What is claimed is:

1. A method for reconciling pronunciation differences between a vocabulary of a recognition engine and a vocabulary of a text to speech (TTS) engine in a speech application, comprising the steps of:

comparing a pronunciation of each word in said vocabulary of said recognition engine with a corresponding pronunciation of each said word in said vocabulary of said TTS engine; and, for each word for which said pronunciations are different, adding said recognition engine pronunciation of said word having a different pronunciation to an exception dictionary of said TTS engine.

2. The method of claim 1, wherein before adding said recognition engine pronunciation of said word having a different pronunciation to said exception dictionary, said method further comprises the step of testing each said word having a different pronunciation for form consistent with said exception dictionary.

3. The method of claim 2, wherein each said word having a different pronunciation which is not consistent in form with said exception dictionary is converted to a suitable form prior to being added to said exception dictionary.

4. The method of claim 3, wherein said pronunciations are compared by comparing baseforms of said pronunciations.

5. The method of claim 2, wherein said pronunciations are compared by comparing baseforms of said pronunciations.

6. The method of claim 1, wherein said pronunciations are compared by comparing baseforms of said pronunciations.

7. A method for reconciling pronunciation differences between a vocabulary of a recognition engine and a vocabulary of a text to speech (TTS) engine in a speech application, comprising the steps of:

comparing a pronunciation of each word in said vocabulary of said recognition engine with a corresponding pronunciation of each said word in said vocabulary of said TTS engine;

for each word for which said pronunciations are substantially the same, repeating said comparing step for a different word in said vocabulary;

for each word for which said pronunciations are different, determining if said pronunciation of said word in said vocabulary of said recognition engine is in a form compatible with an exception dictionary of said TTS system;

for each word having a different pronunciation which is in a form compatible with said exception dictionary of said TTS system, adding said recognition engine pronunciation of said word having a different pronunciation directly to said exception dictionary and repeating said comparing step for a different word in said vocabulary; and, for each word having a different pronunciation which is in a form incompatible with said exception dictionary of said TTS system, converting said word having a different pronunciation in an incompatible form to a compatible form, adding said converted pronunciation of said word having a different pronunciation to said exception dictionary, and repeating said comparing step for a different word in said vocabulary.

8. The method of claim 7, wherein said pronunciations are compared by comparing baseforms of said pronunciations.

* * * * *